United States Patent

Fanti

[11] Patent Number: 5,834,081
[45] Date of Patent: Nov. 10, 1998

[54] TILES, METHOD OF MANUFACTURING TILES FROM PLASTIC MATERIAL AND EQUIPMENT FOR FACILITATING SUCH MANUFACTURE

[75] Inventor: Luigi Fanti, Coventry, United Kingdom

[73] Assignee: The Amtico Company Limited, Somerset, United Kingdom

[21] Appl. No.: 787,890

[22] Filed: Jan. 23, 1997

Related U.S. Application Data

[63] Continuation of Ser. No. 256,178, filed as PCT/GB92/02361 Dec. 18, 1992 published as WO93/13281 Jul. 8, 1993, abandoned.

[30] Foreign Application Priority Data

Dec. 30, 1991 [GB] United Kingdom ................... 9127473

[51] Int. Cl.⁶ ........................................................ B32B 3/10
[52] U.S. Cl. ............................. 428/44; 52/311.2; 52/391; 52/392; 156/73.1; 156/73.4; 156/268; 156/272.2; 156/304.1; 156/304.6; 428/45; 428/46; 428/50; 428/192; 428/194
[58] Field of Search .................................. 428/44, 45, 46, 428/50, 192, 194; 52/392, 391, 311.2, 102; 156/73.1, 73.4, 304.1, 304.6, 272.2, 268

[56] References Cited

U.S. PATENT DOCUMENTS

| | | | |
|---|---|---|---|
| 2,108,226 | 2/1938 | Johnston | 404/42 |
| 2,841,004 | 7/1958 | Maccaferri | 52/390 |
| 3,056,235 | 10/1962 | Makray | 52/390 |
| 3,647,587 | 3/1972 | MacDonald | 156/71 |
| 3,897,296 | 7/1975 | Waldrum | 156/304 |
| 4,405,539 | 9/1983 | Schulte et al. | 264/77 |
| 4,678,528 | 7/1987 | Smith | 156/220 |
| 4,738,247 | 4/1988 | Moore | 126/433 |
| 4,828,896 | 5/1989 | Fanti | 428/67 |
| 4,904,513 | 2/1990 | De Nicolo | 428/46 |
| 5,098,760 | 3/1992 | Fletcher | 428/46 |
| 5,370,368 | 12/1994 | Terrels | 256/19 |

*Primary Examiner*—Nasser Ahmad
*Attorney, Agent, or Firm*—Dann, Dorfman, Herrell and Skillman; Henry H. Skillman

[57] ABSTRACT

A plastics tile (9) is made up of a plurality of discrete plastics pieces (10, 11, 12) which are shaped relative to each other and assembled together to abut edge to edge in lower regions of the pieces and form a recess above each mutually abutting edge of abutting pieces in upper regions of the pieces. The pieces are joined together along said mutually abutting edges below the recesses to form a unitary tile.

23 Claims, 1 Drawing Sheet

TILES, METHOD OF MANUFACTURING TILES FROM PLASTIC MATERIAL AND EQUIPMENT FOR FACILITATING SUCH MANUFACTURE

This is a continuation of application Ser. No. 08/256,178, filed as PCT/GB92/02361 Dec. 18, 1992 published as WO93/13281 Jul. 8, 1993, now abandoned.

BACKGROUND OF THE INVENTION

1. Field of the Invention

This invention relates to tiles, to a method of manufacturing tiles from plastics materials, and to equipment for facilitating such manufacture.

In particular, although not exclusively, the present invention is concerned with the manufacture of plastics floor tiles which have a predefined pattern of blocks with a wood grain appearance which resemble wooden parquet floors.

2. Discussion of Prior Art

One way of manufacturing such tiles, in the past, has been to pre-print each tile with a preset pattern of blocks. In this case every tile has exactly the same pattern of blocks and it is difficult to make the whole floor resemble a natural wooden block parquet floor because it is impossible to achieve a random effect. To overcome this monotony, one could produce a number of sets of tiles with each set of tiles being of the same pattern of blocks as all the other sets but with different wood grain effects for each set of tiles. Such approaches have been quite expensive to produce because of the different sets of artwork required to make each tile. Furthermore, it is impossible to achieve a totally random effect.

An object of the present invention is to provide a plastics tile which is made of a number of predetermined shaped pieces which are joined together to produce a unitary tile.

SUMMARY OF THE INVENTION

According to one aspect of the present invention there is provided a plastics tile comprising a plurality of discrete plastics pieces which are shaped relative to each other and assembled together to abut edge to edge in lower regions of the pieces and form a recess above each mutually abutting edge of abutting pieces in upper regions of the pieces, said pieces being joined together along said mutually abutting edges below the recesses to form a unitary tile.

Preferably the upper regions of the peripheral edge of each piece that abuts another piece is provided with a chamfer to form V-shaped recesses extending down from the top surface of the tile along the mutually abutting edges of the pieces, and the pieces are joined together through the full depth of the extent of the edges that contact adjoining pieces below the bottom of the recesses.

Preferably the joins are continuous joins, but they could be joined at spots at spaced intervals along the edges between mutually abutting pieces.

In a preferred embodiment each piece comprises a top layer of translucent plastics material, a printed layer and a backing layer, and the pieces are joined together through the thickness of the backing layer.

According to a further aspect of the invention a method of manufacturing a tile comprises the steps of cutting a plurality of complementary shaped pieces from a sheet of plastics material, the pieces having recessed edges in upper regions thereof, assembling the pieces to form the precursor of a tile of the required shape with abutting edges below said recesses between each pair of adjacent pieces, and effecting a join at said edges below the bottom of each said recess to form a unitary tile.

Conveniently at least two sets of at least two pieces cut from sheet stock are used to assemble each unitary tile, the pieces of each set being shaped so that they can be interengaged in a plurality of different ways to give the same shaped unitary tile whereby to provide a reduced probability of producing two tiles of identical appearance from sheet stock of standard appearance.

Preferably the join is effected by welding using a tool that localises the heating effect to the mutually abutting edges below the bottom of each recess. The preferred form of heating is dielectric heating, but other forms of joining such as ultrasonic welding, or heat bonding using heated platens could be used. If desired forms of joining can be used that do not rely on heating, for example adhesive bonding or solvent bonding may be used.

The method of manufacture is conveniently conducted using a dielectric heating device in which the shaped pieces are assembled in a rimmed base member of the device and are conjoined by welding along mutually abutting edges between the base member and an electrode of the heating device, which electrode has projections entering recesses formed along said mutually abutting edges.

BRIEF DESCRIPTION OF DRAWINGS

The present invention will now be described by way of example and with reference to the accompanying drawing, in which.

DESCRIPTION OF PREFERRED EMBODIMENTS

Figure 1:
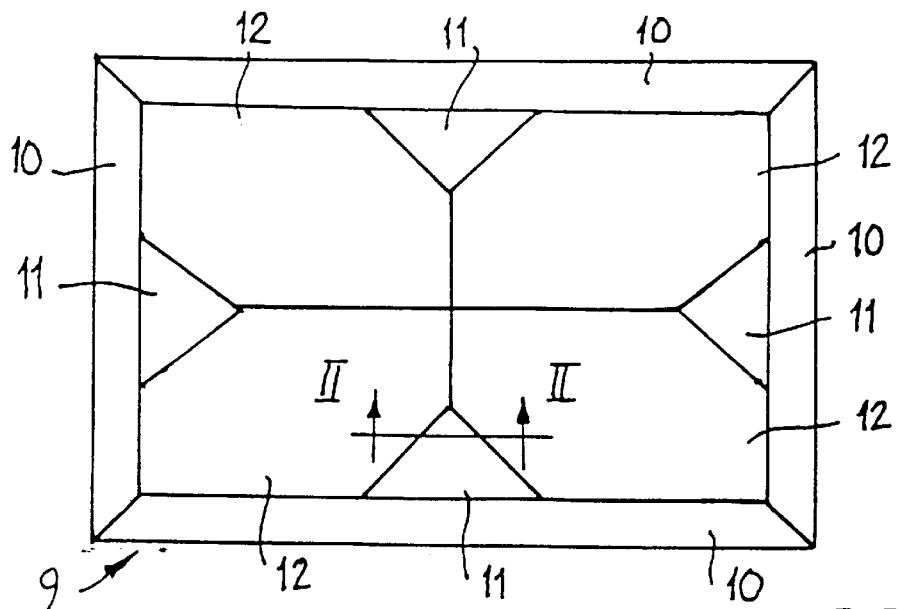
FIG. 1 is a plan view of a single tile constructed in accordance with the present invention, made of a plurality of pieces which are joined together.
Figure 2:
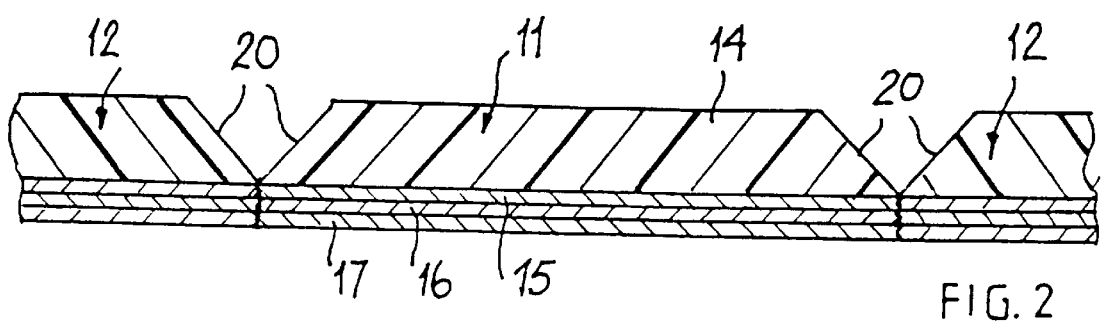
FIG. 2 is a cross-sectional elevation, on an enlarged scale, through part of the tile taken along line II—II of FIG. 1, showing, schematically, the join between two adjacent pieces.

Referring to FIG. 1, each tile 9 is made of three sets of pieces 10, 11 and 12. Each set of pieces (10, 11 or 12) comprises four identically shaped pieces. All the pieces for each set are cut from a large sheet of plastics material approximately 1 meter wide.

The sheet of material comprises laminations consisting of a top translucent PVC wear layer 14 approximately 1.0 mm thick which is bonded to a thin PVC film 15 which is printed with a woodgrain effect with a coloured background. The film 15 is bonded to a white PVC background layer 16 which has the effect of lightening the coloured background of the film 15. The white layer 16 is bonded to a black PVC backing layer 17. The bonding of the layers is achieved by laying up the layers 14, 15, 16 and 17 and heat bonding them under pressure to produce a laminated sheet that is about 2.5 mm thick.

Although the pieces making up each set of pieces 10, 11 or 12 are of identical size and shape and are cut from a large sheet of the material, the wood grain effect varies from one piece to another, despite the fact that the wood grain effect pattern is repeated on the large sheet from which the pieces are cut. Furthermore, because the pieces of each set are identical and symmetrical, even if, against the odds, the pattern were the same on a number of identically shaped pieces of any set, it is highly unlikely that one would produce two tiles with exactly the same woodgrain effects on all the pieces of two or more tiles. Accordingly, by assembling the sets of pieces 10, 11 and 12 to make a tile it is possible to achieve a totally random effect.

As described, three sets of four pieces each, are used but other arrangements are possible from a minimum of two sets of at least two pieces per set.

Each of the pieces is cut from the larger sheet of material using a tool which is described in our International Patent Application No. PCT/GB92/02115. Each piece has a chamfered edge 20 in its upper region in which the chamfer is approximately 45° and extends to a depth not deeper than the film 15.

Figure 3:
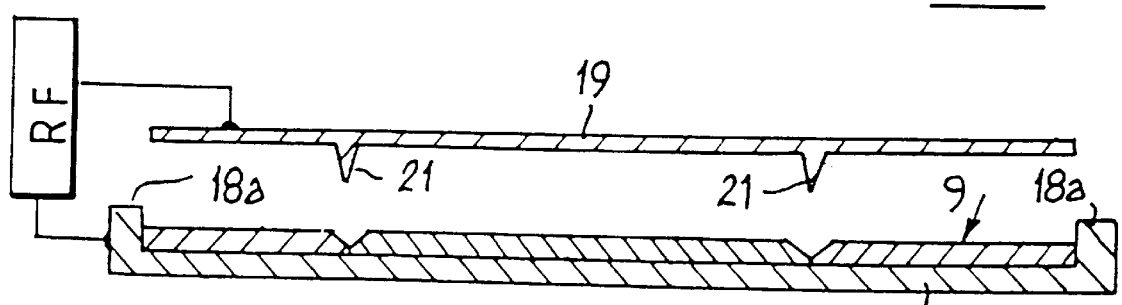
FIG. 3 shows a dielectric heating device for making the tile of FIG. 1.

The four pieces of each of the three sets 10, 11 and 12 are assembled by abutting the edges of the pieces over lower regions thereof to make a precursor tile measuring 300×300 mm, and one or more of such tile precursors are held in a dielectric heating welding machine shown schematically in FIG. 3 which consists of a metal base 18 having rims 18a and a metal top member 19. The top member 19 has projections 21 which define a pattern of shapes identical to the pieces of the sets 10, 11 and 12 and effectively defines weld lines corresponding to the abutting edges between the pieces 10, 11 and 12. The base 18 and top member 19 effectively constitute the electrodes of a radio frequency dielectric heating unit.

The power supply to the electrodes 18 and 19 is taken from a 15Kw, 29Ka power supply unit running at a frequency of 27 MHz and automatically adjusts the voltage level to maintain correct dielectric heating of the layers to be welded. In order to reduce problems of localised overheating in the welds due to presence of moisture, the base 18 and top member 19 are preheated to a temperature between 40° C. and 100° C. by means of water-heated heat exchangers (not shown) in contact with the base 18 and the top member 19. Heating the base 18 and top member 19 also has a beneficial effect by imparting some heat into the region to be welded but not sufficient heat to damage the wear layer 14 of the tile.

Figure 4:
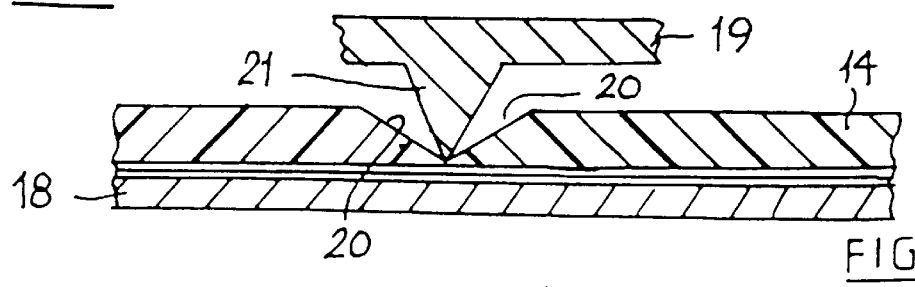
FIG. 4 shows, in greater detail, the design of part of one electrode of the device of FIG. 3.

Referring to FIG. 4, the projections 21 on the top electrode 19 are of a smaller included angle than that defined by the two chamfered edges 20 of the abutting pieces (which is about 136°).

To avoid thermal damage to the exposed upper surface of the wear layer 14 during the welding, the semi-angle of the recess created by the edges 20 should be greater than the semi-angle of the projection. A semi-angle of the recess exceeding 45° (e.g. 68°) and a semi-angle of the projection of not more than 45° is preferred.

By providing the top electrode 19 with a sharp point at the tip of the projections 21, the shortest path for the electrical field generated during dielectric welding will be vertically through the tile between the member 19 and the base 18. This ensures that only a minimum amount of the tile is heated when the pieces are welded together and avoids disfiguring damage to the exposed upper surface of the tile. This lack of damage is made possible by the fact that the pieces are chamfered or recessed downwardly from the top surface.

The base member 18 can have two adjustable rims 18a whereby after laying the twelve pieces 10, 11 and 12 onto the base member in the required array (e.g. as shown in FIG. 1) the rims 18a are moved to close the pieces together to form the rectangular configuration shown with confronting edges in lower regions of the pieces in abutment.

The electrode 19 is lowered into contact with the assembled pieces and an electrical current at a frequency of 27 MHz is applied through the base 18 and electrode 19 to generate dielectric heating and melt and thereby fuse, or weld, only the lower regions (that is to say the layers 15, 16 and 17) to form a unitary tile. In this way all of the pieces are butt welded together along welded joints extending around the various pieces.

Whilst it is preferred to effect the welding as a "single-shot" process using radio frequency energy sufficiently powerful to weld all the seams simultaneously, it is to be understood that other techniques can be used. We have used a "spot-welding" technique where electromagnetic dielectric heating was used to effect "spot" welds at closely spaced intervals along each line of abutting edges, instead of producing a continuous weld, however it has been found that after the tiles had been laid in place on a floor for some time, the location of the spot welds became manifest as slight blemishes in the unitary tile.

The welding can also be carried out from the underside of the table, that is to say from the backing layer 17 side of the tile. In this case the pieces are laid on the base of the jig with the translucent layer 14 facing the base and the top member 19 is brought down against the backing layer 17 to melt and fuse the abutting edges of the layers 15, 16 and 17. In this case the base 18 of the jig would have protrusions (similar in shape and size to the protrusions 20) that fit in the "V" shape defined by the chamfered edges of the pieces 10, 11 and 12 as shown in FIG. 4. It is much more difficult to assemble the pieces on a base plate 18 which has projections corresponding to the seam lines because each piece has to locate perfectly in the recesses formed by the raised projections. However there may be instances where it is advantageous to concentrate the electric field on the back surface of the tile.

An essential requirement of layers to be welded together in accordance with the dielectric heating embodiment of the present invention is that they are susceptible to absorption of electromagnetic energy by the dielectric effect. Almost all solid non-conductive plastics will absorb energy by dielectric heating to a certain extent. Some plastics such as polyethylene and polystyrene for example have relatively low dielectric heat absorption characteristics; these are often said to have a low "loss factor". On the other hand PVC has a relatively high "loss factor" and will absorb electromagnetic energy by the dielectric effect. Therefore if one wishes to use a low "loss-factor" plastic as the backing layer one will need to modify its characteristics to increase its "loss-factor" by the addition or alloying of particles or other polymers.

In the above embodiment the method of joining is achieved using a dielectric heating method. Other forms of welding such as, for example, ultrasonic welding, or heat bonding using heated platens which are pressed into contact with the lower layers of the tile could be used for materials which will not absorb energy by dielectric heating. Indeed the joining may be done by adhesive bonding or by solvent bonding, although this is thought to be slightly more messy than the preferred welding methods.

In order to obtain an attractive tile it has been found to be essential to effect bonding or joining only in the lower regions of each tile, and not in the translucent layer 14. The chamfered edges of the pieces give the appearance of the wood grain extending through the entire depth of the translucent layer. In addition, by only joining those layers which are normally out of sight, one can use different thermoplastics at the surface of the tile which would be otherwise non-weldable using dielectric heating methods or otherwise unsuitable for joining or bonding.

Although the present invention is eminently suitable for making parquet type floor tiles with woodgrain patterning of the shapes shown in FIG. 1, the invention may be used to join assembled pieces of any shape and colour to make unitary tiles.

In the embodiments described above, the pieces have an angled chamfer. It is to be understood that the top edge of each piece may be cut back with a vertical, rounded or other shaped edge which forms a small groove or recess in the top face of the tile at each join between pieces.

In the illustrated embodiment, a portable prefabricated unitary plastic tile is provided having a top surface, a bottom surface, and an outer periphery, said outer periphery defining the plan area of said tile. The tile 9 comprises at least a first plastic piece 11 having a first upper surface, a first lower surface, a first inclined surface 20 inclined to said first upper surface, and a first weld region adjacent said first inclined surface, and a second piece 12 comprising a second upper surface, a second lower surface, a second inclined surface 20 inclined to said second upper surface, and a second weld region adjacent said second inclined surface. The first and second weld regions are welded together to form the unitary tile 9 by a weld joining the first and second tile pieces and forming a weld line. Furthermore, a groove is provided on said top surface of the tile extending over said weld line, the groove being defined by said first and second inclined surfaces 20 which are unwelded to each other, the depth of said weld in the direction from said top surface to said bottom surface being less than the distance in that direction between said top surface and said bottom surface by the depth of said groove. The groove between the surfaces 20 extends within said plan area of said tile.

In the portable prefabricated unitary plastic tile 9 so produced, the said first and said second inclined surfaces comprise chamfered edges 20 to their respective tile pieces which are inclined relative to said upper surfaces of their respective piece by an angle of at least 45°, said groove comprising a V-shaped groove.

The weld extends for the full depth of the thickness of that part of said tile that is beneath said groove. The lower surfaces of said first and second lower pieces are flat and contiguous, and the bottom surface of the tile is then flat. A colored layer may be provided between said backing layer and said printed layer.

At least four distinct pieces can be provided, each with a different pattern, and with no two adjacent pieces having their patterns the same. The outer periphery of said tile can be chamfered. At least one of said first and second pieces can be shaped non-rectangularly, and said plastic tile can be shaped rectangularly.

Looked at another way, we provide a portable prefabricated unitary plastic floor tile 9 having a peripheral edge and a plan area, said tile comprising a plurality of discrete plastic pieces 10, 11 and 12 which are shaped relative to each other and assembled together to abut edge to edge in lower regions of said pieces, said pieces being provided in upper regions of said pieces with groove-defining surfaces 20 adjacent their abutting edges and defining grooves extending parallel to, and above, said abutting edges; said pieces being welded together to form a unitary tile by a weld along said mutually abutting edges, said weld being below said grooves, with said groove-defining surfaces 20 being unwelded, and wherein at least some of said grooves extend away from said peripheral edge of said tile into the plan area of said tile.

We also provide a method of forming a portable prefabricated unitary plastic tile comprising taking a plurality of discrete pieces 10, 11 and 12 of plastic material each of which has an upper surface, a weld region, and an inclined surface inclined relative to its upper surface; placing said plurality of pieces adjacent each other to form a precursor of said unitary tile, and so that where two pieces abut, they do so along respective weld surfaces, and so that said pieces have their respective inclined surfaces forming a groove extending over said weld surfaces; and welding said weld surfaces of said pieces together so as to leave unwelded oppositely facing inclined surfaces 20 defining said groove, with said grooves extending away from a peripheral edge of said tile into the plan area defined by the outer periphery of said tile.

In accordance with this method, the welding step can be carried out by dielectric heating of the pieces in the vicinity of the mutually abutting weld regions, and said pieces can be cut from a sheet stock having a pattern visible from its upper surface, and wherein a plurality of pieces of the same shape but with out-of-register patterns are provided so that each piece does not have the same appearance, and wherein the pieces may be assembled to form the precursor of the unitary tile in a plurality of different ways so that there is a reduced probability of producing two tiles of identical appearance from sheet stock.

The welding step is carried out with the use of a welding jig in which the shaped pieces are assembled in a rimmed base member of the jig and are conjoined by welding along mutually abutting edges through dielectric heating of the pieces between the base member and a top electrode, which top electrode has projections entering said grooves formed along said mutually abutting weld regions.

The recesses may have a semi-angle greater than 45° and said projection may have a semi-angle of not more than 45°. Also, the welding jig may have a base member with at least one adjustable rim which can be used to close the weld regions of the pieces together prior to welding. The join can be effected by ultrasonic or by solvent welding.

I claim:

1. A portable prefabricated unitary plastic tile having a top surface, a bottom surface, and an outer periphery, said outer periphery defining the plan area of said tile; said tile comprising: at least a first plastic piece having a first upper surface, a first lower surface, a first inclined surface inclined to said first upper surface, and a first weld region adjacent said first inclined surface: and a second piece comprising a second upper surface, a second lower surface, a second inclined surface inclined to said second upper surface, and a second weld region adjacent said second inclined surface, said first and second weld regions being welded together to form said unitary tile by a weld joining the first and second tile pieces and forming a weld line; and a groove on said top surface of said tile extending over said weld line, said groove being defined by said first and second inclined surfaces which are unwelded to each other and having a depth equal to the distance between the top surface and the lowermost edges of the first and second inclined surfaces, the depth of said weld in the direction from said top surface to said bottom surface being less than the distance in that direction between said top surface and said bottom surface by at least the depth of said groove; and wherein said groove extends within said plan area of said tile.

2. A portable prefabricated unitary plastic tile according to claim 1 wherein said first and said second inclined surfaces are inclined relative to said upper surface of their respective piece to substantially the same angle.

3. A portable prefabricated unitary plastic tile according to claim 2 wherein said first and said second inclined surfaces comprise chamfered edges to their respective tile pieces and are inclined relative to said upper surfaces of their respective piece by an angle of at least 45°, said groove comprising a V-shaped groove.

4. A portable prefabricated unitary plastic tile according to claim 3 wherein said weld extends for the full depth of the thickness of that part of said tile that is beneath said groove.

5. A portable prefabricated unitary plastic tile according to claim 1 wherein said first and second lower surfaces are flat and contiguous, and said bottom surface is flat.

6. A portable prefabricated unitary plastic tile according to claim 1 wherein said weld line comprises at least one of the group: a) a line of spot welds; b) a continuous weld line.

7. A portable prefabricated unitary plastic tile according to claim 1 wherein each piece comprises a top layer of translucent or transparent plastic material; a printed layer, and a backing layer; and wherein said groove in said tile does not extend deeper than said top layer.

8. A portable prefabricated unitary plastic tile according to claim 7 wherein there is a colored layer between said backing layer and said printed layer.

9. A portable prefabricated unitary plastic tile according to claim 1 wherein said first and said second pieces are different colors when looking down onto their upper layers.

10. A portable prefabricated unitary plastic tile according to claim 1 wherein when viewed from above said first piece has a pattern, and said second piece has a pattern, and wherein the pattern of said first piece is different from the pattern of said second piece.

11. A portable prefabricated unitary plastic tile according to claim 10 in which there are at least four distinct pieces each with a pattern, and with no two adjacent pieces having their patterns the same.

12. A portable prefabricated unitary plastic tile according to claim 1 wherein said outer periphery of said tile is chamfered.

13. A portable prefabricated unitary plastic tile according to claim 1 wherein at least one of said first and second pieces is shaped non-rectangularly, and wherein said plastic tile is shaped rectangularly.

14. A portable prefabricated unitary plastic floor tile having a peripheral edge and a plan area, said tile comprising a plurality of discrete plastic pieces which are shaped relative to each other and assembled together to abut edge to edge in lower regions of said pieces, said pieces being provided in upper regions of said pieces with groove-defining surfaces adjacent their abutting edges and defining grooves extending parallel to, and above, said abutting edges; said pieces being welded together to form a unitary tile by a weld along said mutually abutting edges, said weld being below said grooves, with said groove-defining surfaces being unwelded, and wherein at least some of said grooves extend away from said peripheral edge of said tile into the plan area of said tile.

15. A method of forming a plurality of portable prefabricated unitary plastic tiles comprising producing each of said unitary tiles by taking a plurality of discrete pieces of plastic material each of which has an upper surface, a weld region, and an inclined surface inclined relative to its upper surface; placing said plurality of pieces adjacent each other to form a precursor of said unitary tile so that said unitary tile has a peripheral edge and a plan area within said peripheral edge, and so that where two pieces abut they do so along respective weld surfaces, and so that said pieces have their respective inclined surfaces forming a groove extending over said weld surfaces; and welding said weld surfaces of said pieces together so as to leave unwelded oppositely facing inclined surfaces defining said groove, with said grooves extending away from a peripheral edge of said tile into the plan area.

16. A method according to claim 15 wherein the welding step is carried out by dielectric heating of the pieces in the vicinity of the mutually abutting weld regions.

17. A method according to claim 15 including the steps of cutting said pieces from a sheet stock having a pattern visible from its upper surface, and wherein a plurality of pieces of the same shape but different patterns are provided for all of said plurality of unitary tiles, so that each piece does not have the same appearance, and assembling the pieces to form the precursors of the plurality of unitary tiles in a plurality of different ways so that there is a reduced probability of producing two tiles of identical appearance from the sheet stock.

18. A method according to claim 17 wherein the probability of producing tiles of identical appearance is further reduced by forming said pieces from a plurality of sheet stocks, each of different appearance.

19. A method according to claim 15 wherein the welding step is carried out with the use of a welding jig having a rimmed base member and a top electrode having projections including the step of assembling the shaped pieces in the rimmed base member, entering the projections into said grooves formed along said mutually abutting weld regions, and conjoining the pieces by welding along mutually abutting edges through dielectric heating of the pieces between the base member and the top electrode projections.

20. A method according to claim 19 in which said recesses have a semi-angle greater than 45° and providing said projection with a semi-angle of not more than 45°.

21. A method according to claim 19 wherein said jig has a base member with at least one adjustable rim, and using said rim to close the weld regions of the pieces together prior to welding.

22. A method according to claim 15 wherein the join is effected by ultrasonic welding.

23. A method according to claim 15 wherein the join is effected by solvent welding.

* * * * *